of this specification.

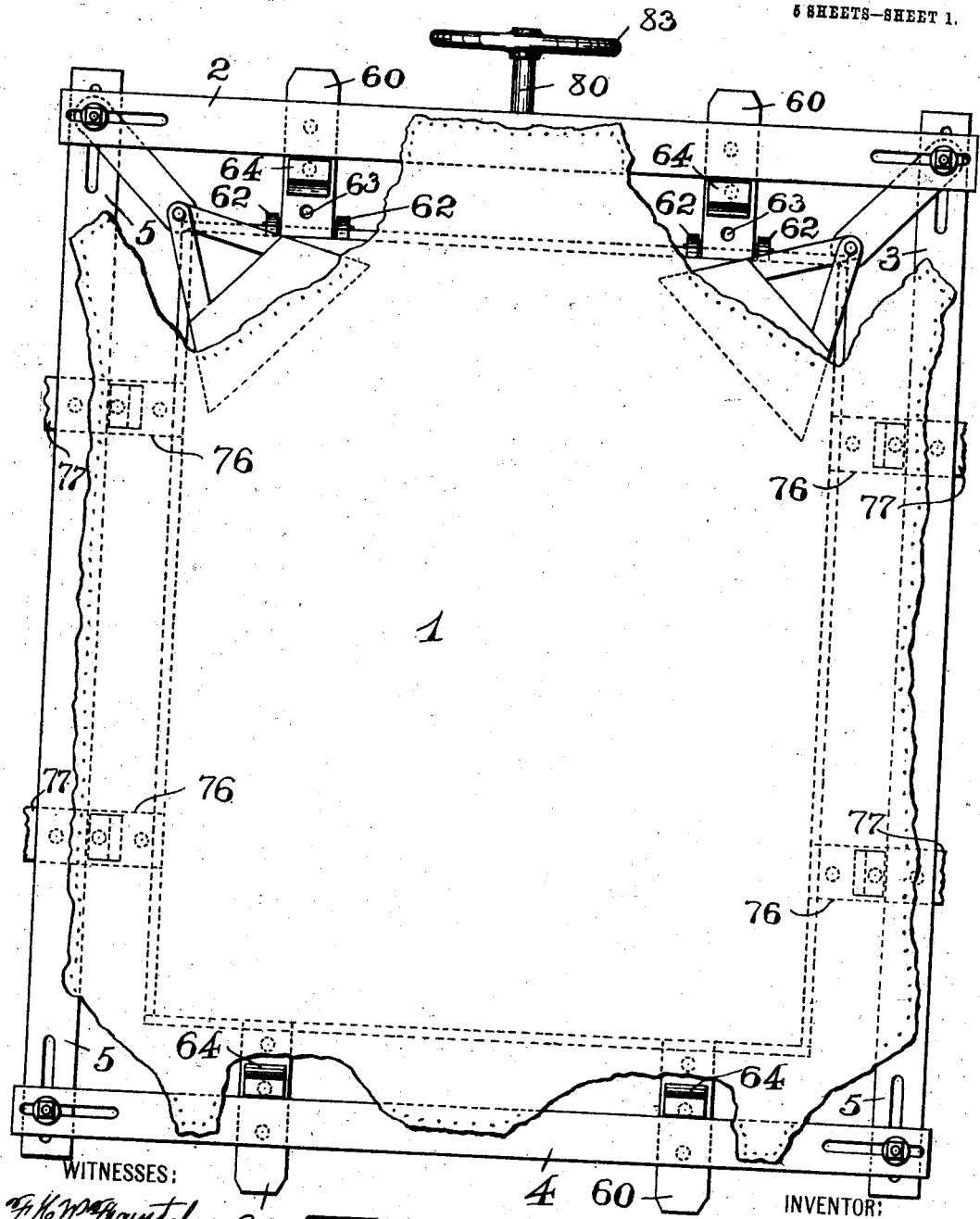

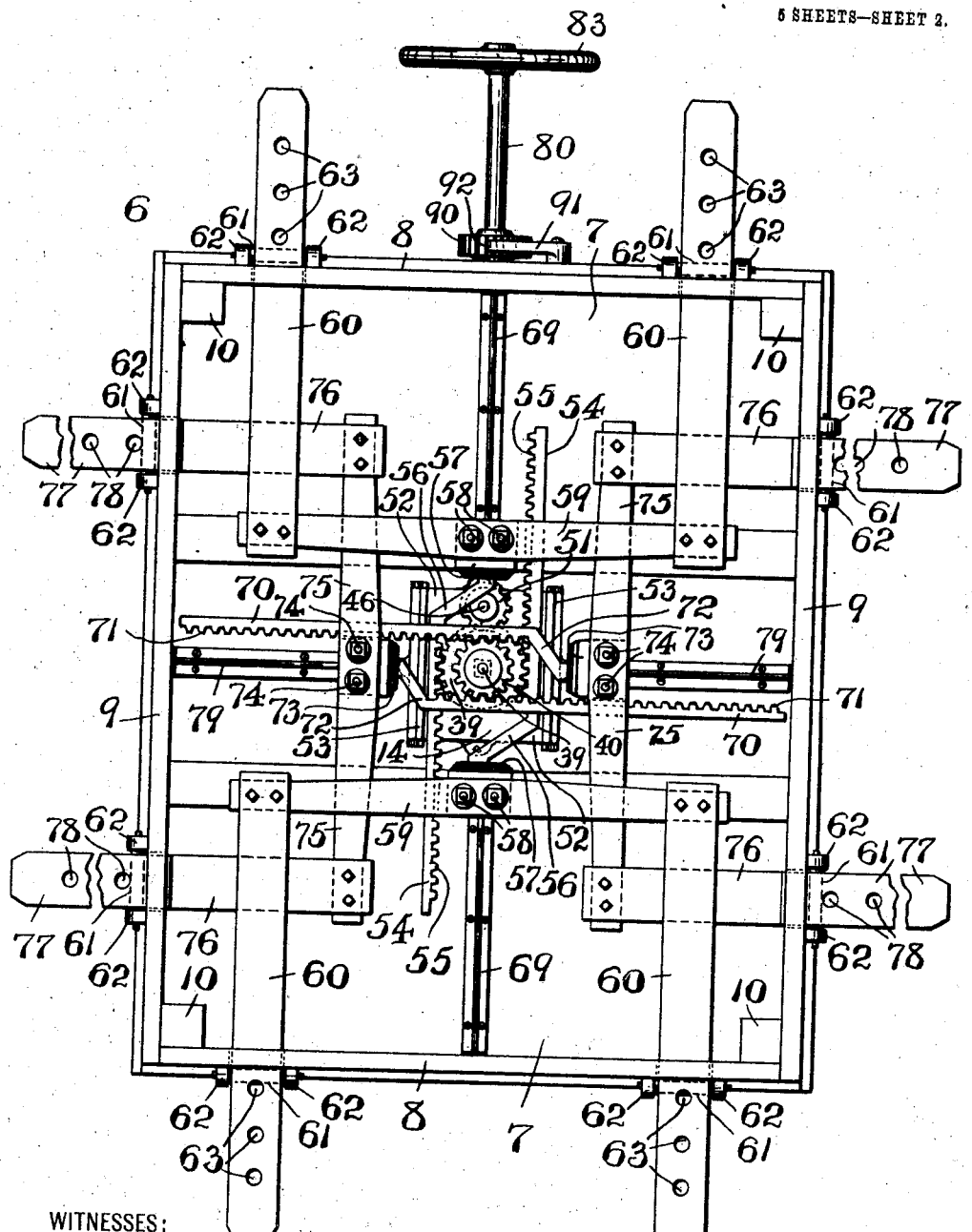

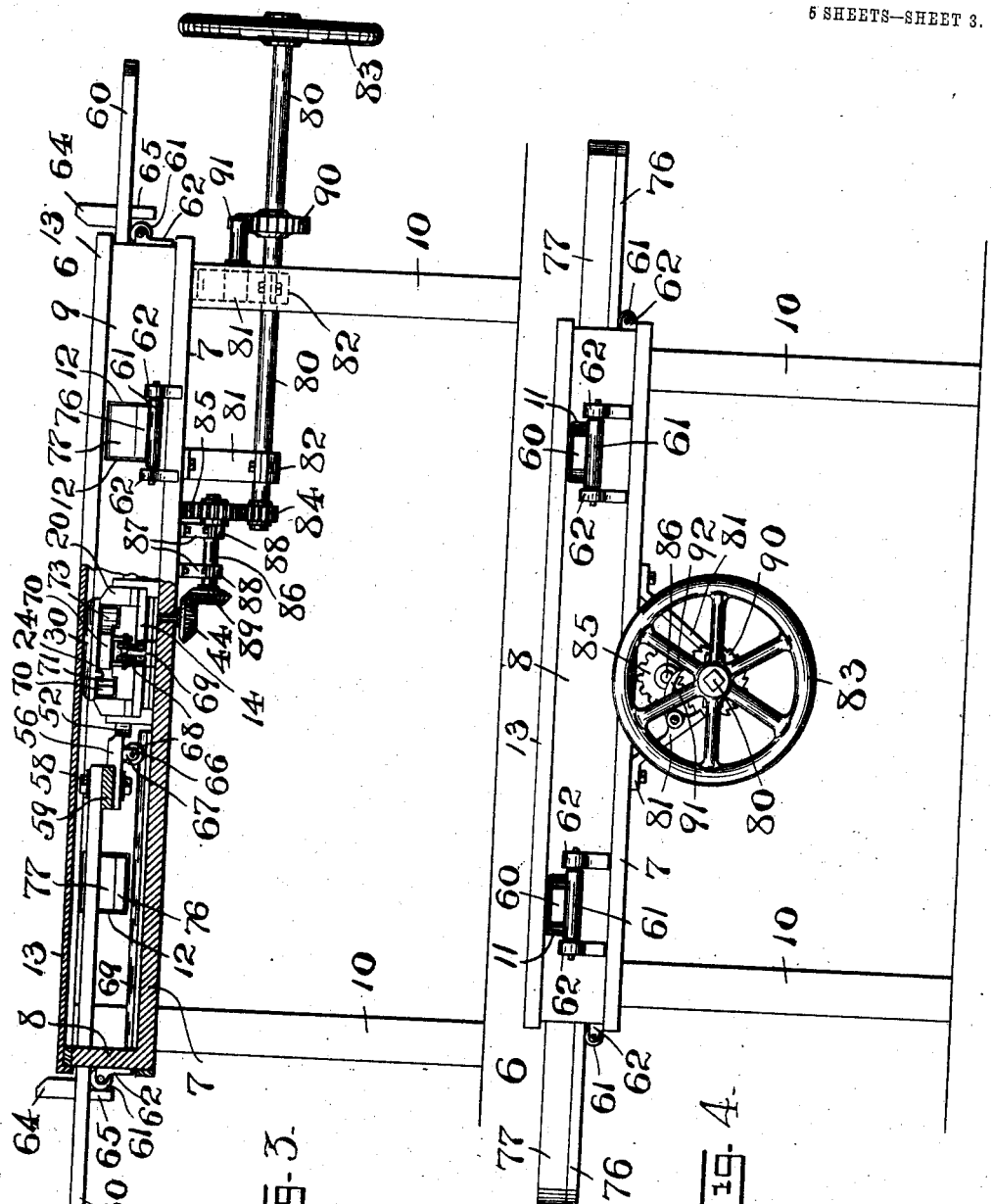

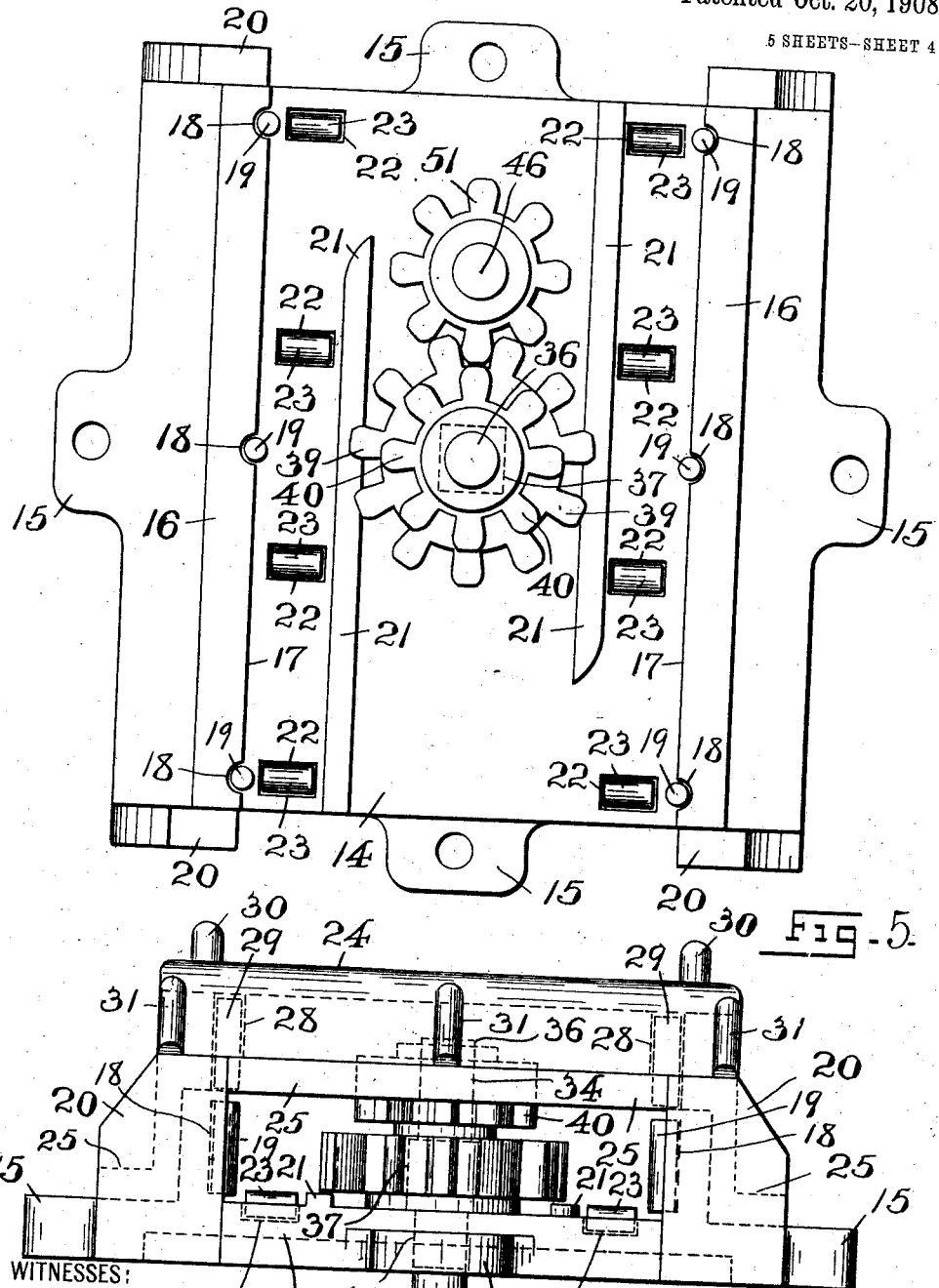

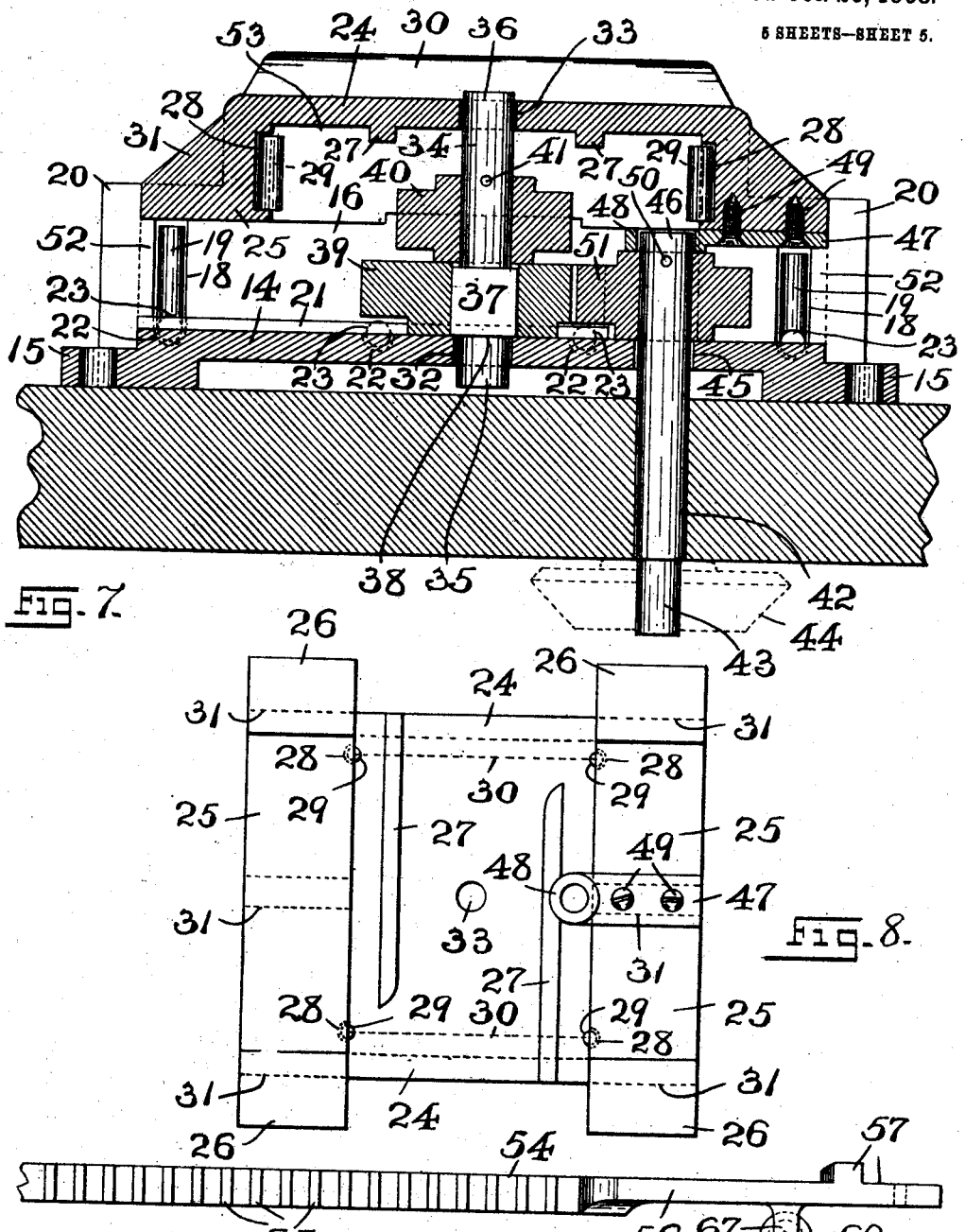

UNITED STATES PATENT OFFICE.

ARTHUR CLEVELAND, OF NEWARK, NEW JERSEY.

APPARATUS OR MACHINE FOR STRETCHING LEATHER, HIDES, OR SKINS.

No. 901,324.　　　Specification of Letters Patent.　　　Patented Oct. 20, 1908.

Application filed December 21, 1907. Serial No. 407,601.

*To all whom it may concern:*

Be it known that I, ARTHUR CLEVELAND, a citizen of the United States, residing at Newark, in the county of Essex and State of New Jersey, have invented certain new and useful Improvements in Apparatus or Machines for Stretching Leather, Hides, or Skins; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in that class of apparatus or devices used for the purpose of stretching leather, hides or skins; and, the invention relates, more particularly, to that class of apparatus in which the leather, hide or skin is arranged in a leather-stretching frame, which frame forms an independent and separable part from the apparatus which embodies the principles of the present invention, said frame being adapted to be placed upon the table or bed of the apparatus and its various frame-members being placed against suitable lugs, blocks, or the like, which are used in conjunction with movable stretching slides of the apparatus, which, by means of suitable mechanism are moved in opposite directions against the frame-members of the independent stretching frame in which the leather, hide or skin is supported, to stretch the leather, hide or skin to its fullest capacity without danger of weakening the same.

The present invention has for its principal object to provide a simply constructed and readily and easily operated leather or hide-stretching apparatus of the general character hereinafter set forth; and one, in which all the " puckers," creases and other uneven spots in the leather, skin or hide are removed therefrom, and the latter is evenly and uniformly stretched in all directions to its fullest extent.

A further object of this invention is to provide a leather-stretching device or apparatus in which the hide or skin in the frame, when placed upon the table of the stretching machine or apparatus, is stretched much faster one way than in another direction, substantially for the purposes hereinafter more fully set forth, and thereby provides a means for more readily obtaining all the possible " stretch " out of a hide or skin.

Other objects of the present invention not at this time more particularly enumerated will be clearly evident from the following detailed description of the same.

The invention is clearly illustrated in the accompanying drawings, in which:—

Figure 1 is a plan view of the stretching machine or apparatus embodying the principles of this invention, with the independent stretching frame and a hide or skin supported in said frame shown in its operative and stretched position upon the table or bed of the apparatus. Fig. 2 is a similar view of the device, with a certain plate of the interior mechanism omitted from said view, to show the general arrangement of a gear-mechanism and racks for operating the several stretching-bars. Fig. 3 is a part longitudinal section and part side elevation of the apparatus; and Fig. 4 is an end view of the machine or apparatus, looking in a direction toward the operating wheel of the device. Fig. 5 is a plan view, on an enlarged scale, of the gear-mechanism and lower member of a box in which the racks are slidably arranged, the racks being omitted from said view; and Fig. 6 is a side view of said gear-mechanism and the lower and upper members of said box. Fig. 7 is a transverse section taken on a vertical plane on line 9—9 in said Fig. 6; and Fig. 8 is a plan view of the under side of the top-member or cover of said box, said view being made on a reduced scale. Fig. 9 is a side elevation of one of the racks.

Similar characters of reference are employed in all of the above described views, to indicate corresponding parts.

Referring now to the several figures of the drawings, the reference-character 1 indicates a piece of leather, hide or skin which is suspended in any usual manner between the four adjustably connected frame-pieces or members 2, 3, 4 and 5 of any well-known construction of ordinary leather-stretching frame. The stretching machine or apparatus with which such stretching frame may be used is indicated more particularly by the reference-character 6. The said apparatus, which may be made of any suitable material, preferably wood, consists, essentially, of a box-like body comprising a bottom 7, two end-pieces 8, and two sides 9, supported upon suitable legs or standards 10. The end-pieces 8 are provided with suitably disposed openings 11, and the sides 9 are in a like manner provided with suitably disposed openings 12, the openings 12, however, being larger than the openings 11, as clearly shown in Figs. 3 and 4 of the drawings, and for the purposes hereinafter more fully set forth. Suitably disposed upon the upper edges of said end-pieces 8 and sides 9 is a cover 13, which is preferably removably placed upon the said parts, and which I shall hereinafter term the table or bed of the apparatus, upon which the hide or skin rests during the stretching operation. Suitably secured upon the said bottom 7, so as to be centrally located between the opposite end-pieces 8 and the opposite sides 9 of said box-like body, is a box-like member in which is contained a gear-mechanism which can be operated for producing reciprocatory actions of a number of operating racks, in the manner to be presently more fully described. This box-like member comprises a suitably formed base or bottom plate 14, which is provided with perforated ears or lugs 15 for the reception of bolts or screws by means of which the said plate can be secured in its fixed position upon the said bottom 7, as will be clearly evident. The said plate 14, is provided near two of its edge-portions with suitably formed ribs or supporting members 16, which may be provided in their inner faces 17 with receiving sockets 18 in which may be disposed suitable rollers 19.

At each end of each rib or supporting member 16 is a post 20. The base or bottom-plate is also preferably provided with another pair of ribs 21, and with any suitable number of receiving sockets 22 in which are disposed suitable rollers 23. Resting upon upper edges of said ribs or supporting members 16 is a top-plate or cover 24, said plate being formed with the right-angled portions or members 25, which are adapted to be fitted upon said members 16, with the end-portions 26 of each member 25 resting against the posts 20, so as to prevent lateral displacement, as will be evident. The said plate 24 may also be provided with a pair of ribs 27, and said right-angled portions or members 25 may be made with receiving sockets 28, in which are suitably disposed rollers 29. Upon its upper surface the said plate or cover 24 may be made with ribs 30, and the right-angled portions or members 25 may be strengthened by means of suitably formed webs 31. Rotatably arranged in correspondingly arranged holes 32 and 33 in the respective bottom and top-plates 14 and 24 are the cylindrical end-portions 35 and 36 of a spindle 34, said spindle being provided with an angularly or polygonally shaped portion 37, the lower shoulder or edge 38 of which rests upon the upper and inner face of said bottom plate 14 for rotatably supporting said spindle in its vertical position between the two plates 14 and 24, as clearly shown in Fig. 7 of the drawings. Suitably arranged upon said angularly shaped part 37 of the spindle, so as to turn with said spindle, is a gear-wheel 39, and arranged above said gear-wheel 39 is another gear-wheel 40, said gear-wheel 40 being mounted upon said spindle, above the said angular portion 37 and being secured to said spindle preferably by means of a pin 41. The said gear-wheels 39 and 40, may be of the same size, but the upper gear 40 is preferably of a less diameter than the diameter of the gear-wheel 39, substantially as shown in the drawings, and for the purposes hereinafter more fully described. Rotatably arranged in an opening or hole 42 in the bottom 7 of the box-like body of the machine or apparatus is a driving spindle 42, having upon its lower end-portion 43 a bevel-gear 44. The upper portion of said spindle 42 is rotatably arranged in a hole 45 in the bottom-plate 14, and extends vertically into the space between the bottom plate 14 and the top-plate or cover 24. The extreme upper end-portion 46 of said spindle 42 is rotatably disposed in a bearing-portion 48 formed in a plate 47 which is secured to the bottom of one of the right-angled portions or members 25 of said plate 24, by means of screws 49 or other suitable fastening devices. Suitably mounted upon that portion of the spindle 42 above the bottom-plate 14, and secured thereon by means of a pin 50, or other fastening means, is a pinion 51, the teeth of which engage with the teeth of the larger gear-wheel 39.

When the two plates 14 and 24 have been secured by means of the plate 14 upon the bottom 7, and the previously mentioned cover or lid 13 is placed down upon the surrounding sides or members 8 and 9 of the body of the machine, then will the lower or under face of the said cover 13 rest and bear directly down upon the upper edge-portions of the ribs 30, as clearly represented in Fig. 5 of the drawings, and the interior of the body of the machine or apparatus is provided with a rack-box formed in all of its opposite sides with the open parts 52 and 53.

Referring now more particularly to Fig. 2 of the drawings, the reference-characters 54 indicate a pair of racks, which are slidably disposed upon the ribs 21 of the lower plate 14 and bear upon the rollers 23 and against the rollers 19, said racks extending from the open parts 52 and having their gear-teeth 55 meshing with the diametrically opposed gear-teeth of the gear-wheel 39. Each rack 54 is also made with an angular or other suitably formed part, as 56, formed with a suitable fastening portion, as 57, to which is secured by means of bolts and nuts 58, or in any other suitable manner, a cross-bar 59.

Suitably connected with the cross-bars 59, at or near the end-portions of each bar, are stretcher-members or elements 60, which extend through the openings 11 in the end-pieces 8, said members 60 resting and moving upon suitable rollers 61, having their ends journaled in bearings 62 suitably secured to said end-pieces 8, substantially as shown in the several figures of the drawings. Each stretcher-member or element 60 is also provided with suitably disposed holes or openings, as 63, for the reception of the studs 65 of the usual frame-lugs 64. As shown, each rack 54 may be provided upon its under side with downwardly extending ears 67, carrying a pin 66 upon which is rotatably arranged between said ears 67, a roller or wheel 68 which rests and is movably disposed upon a rail or track 69, suitably secured upon the bottom 7, as will be clearly understood.

The reference-characters 70 indicate another pair of racks, which are slidably arranged upon the upper edges of the ribs 16 of the plate 14 and beneath the ribs 27 of the plate 24 and against the rollers 29, said racks 70 extending from the open parts 53, and having their gear-teeth 71 meshing with the diametrically opposed gear-teeth of the gear-wheel 40. Each rack 70 is also made with an angular or other suitably formed part, as 72, provided with a suitable fastening-portion, as 73, to which is secured by means of bolts and nuts 74, or in any other suitable manner a cross-bar 75. Suitably connected with the cross-bars 75, at or near the end-portions of each bar, are stretcher-members or elements 76, which extend through the openings 12 in the sides 9, said members 76 resting and moving upon rollers 61, having their ends journaled in the bearings 62 suitably secured to the sides 9. The free end-portions of the stretcher-members or elements 76 which extend beyond the said openings 12 are suitably thickened or provided with a reinforcing block, as 77, so as to bring the upper surface-portions of these members in the same horizontal plane with the upper surface-portions of the stretcher-members 60, so that the frame-members of the stretcher-frame will be properly supported, as will be clearly evident. Each element or member 76 is also provided with suitably disposed holes or openings, as 78, for the reception of the studs 65 of the frame-lugs 64. Each rack 70 is also provided upon its under surface with a wheel or roller, similar to the wheels or rollers used with the racks 54, the wheels or rollers of the racks 70 resting and rolling upon the rails or tracks 79 which are suitably secured upon the bottom 7, substantially as shown.

Having in the foregoing fully described one general arrangement and construction of mechanism disposed within the interior of the body of the stretching machine or apparatus for producing the reciprocatory movements of the racks and the corresponding movements upon each side of the said body of the pairs of stretching bars or members 60 and 76, I will now briefly describe one means for actuating the gear-mechanism which is employed for producing the movements of the racks. This mechanism is shown in a general way in Fig. 3 of the drawings, and consists, essentially, of a shaft 80 which is mounted in suitable bearings 82 of brackets 81 which are secured to and extend downwardly from the bottom 7 of the machine, substantially as shown. At its one end-portion, the said shaft is provided with a hand-wheel 83, or other suitable device, for revolving said shaft 80. Upon its other end, or other suitable portion, the shaft is provided with a pinion 84 which is in engagement with a gear 85 mounted upon another shaft 86. This last-mentioned shaft is rotatably mounted in the bearings 88 of brackets 87, and said shaft is provided with a toothed bevel-wheel or gear 89 which meshes with the bevel-wheel or gear 44. From an inspection of said Fig. 3 it will be seen, that by turning the hand-wheel 83 in either direction, the vertical shaft or spindle 42 will be correspondingly revolved, so as to correspondingly actuate the gears 51, 39 and 40, to produce the corresponding movements of the racks, and the stretcher-elements or members, either in their outward or inward directions, as may be desired.

To retain the various parts of the mechanism in their fixed positions, when the piece of leather, or the skin or hide, has been stretched to its fullest and desired capacity, and before removing the independent stretching frame from the apparatus or machine, with the fully stretched leather, hide or skin in said frame, a ratchet-wheel 90 is arranged and secured upon the shaft 80, and a holding dog or pawl 91 is pivotally connected with one of said brackets 81 or other part of the frame-work of the apparatus, said dog or pawl being adapted to have its free end-portion or nosing 92 brought in detachable holding engagement with the ratchet-wheel 90, substantially as illustrated in Fig. 4 of the drawings, so as to prevent any backward movement or release of the various parts of the mechanism, and while tightening the clamping devices connected with the overlapped portions of the frame-members 2, 3, 4 and 5, as will be clearly evident.

From the foregoing description of my present invention it will be clearly seen, that I have devised a simple and efficiently operating stretching-apparatus or machine, in which the frame-members of the stretching frame, after the piece of leather, skin or hide has been loosely mounted between said frame-members, can be easily and quickly placed in their respective positions against the retaining or holding lugs of the stretching bars or members of the apparatus, the mechanism of the apparatus when set in motion operating to evenly stretch the hide or skin in all directions.

It has been found in practice, that to more perfectly stretch a skin or hide, the stretch should be greater in the directions toward the sides of the hide or skin, instead of toward the neck and tail-end of the skin or hide; and, it is for this reason that the gear-wheel 39 is of greater diameter than the gear-wheel 40, so that the laterally moving racks and corresponding stretcher-bars or members will move faster and further than the other and longitudinally moving racks and corresponding stretcher-bars, and that during the stretching operations, the leather or skins or hides will be properly stretched to a greater degree in the directions toward the two sides, and to a lesser degree toward the neck and tail-ends of the skin or hide.

I am aware that changes may be made in the arrangements and combinations of the devices and parts, as well as in the details of the construction of the same, without departing from the scope of my present invention, as defined in the appended claims. Hence I do not limit my invention to the exact arrangements and combinations of the devices and parts, as described in the foregoing specification, nor do I confine myself to the exact details of the construction of the said parts as illustrated in the accompanying drawings.

I claim:—

1. In a leather-stretching apparatus, the combination with a body forming a table for the support thereon of the skin or hide which is to be stretched, of differentially moving racks, and stretching members extending from the sides of the apparatus and actuated by means of said racks.

2. In a leather-stretching apparatus, the combination with a body forming a table for the support thereon of the skin or hide which is to be stretched, of differentially moving racks, gear-wheels in mesh with the teeth of said racks, and stretching members extending from the sides of the apparatus and actuated by means of said racks.

3. In a leather-stretching apparatus, the combination with a body forming a table for the support thereon of the skin or hide which is to be stretched, of differentially moving racks, gear-wheels in mesh with the teeth of said racks, and stretching members extending from the sides of the apparatus and actuated by means of said racks, a pinion in mesh with one of said gear-wheels, and means for actuating said pinion, substantially as and for the purposes set forth.

4. In a leather-stretching apparatus, the combination with a body forming a table for the support thereon of the skin or hide which is to be stretched, of differentially moving racks, gear-wheels in mesh with the teeth of said racks, and stretching members extending from the sides of the apparatus and actuated by means of said racks, a pinion in mesh with one of said gear-wheels, and means for actuating said pinion, consisting of a shaft provided with means for operating the same, a gear-wheel on said shaft, a second shaft, a gear-wheel on said second shaft with which the gear-wheel of the first-mentioned shaft engages, a bevel-gear on said second shaft, and a second bevel-gear arranged upon the spindle of said pinion and in mesh with said first-mentioned bevel-gear, substantially as and for the purposes set forth.

5. In a leather-stretching apparatus, the combination with a body forming a table for the support thereon of the skin or hide which is to be stretched, of a series of cross-bars, differentially moving racks connected with said cross-bars, and stretching members extending from each cross-bar and from the sides of the apparatus.

6. In a leather-stretching apparatus, the combination with a body forming a table for the support thereon of the skin or hide which is to be stretched, of a series of cross-bars, differentially moving racks connected with said cross-bars, gear-wheels in mesh with the teeth of said racks, and stretching members extending from each cross-bar and from the sides of the apparatus.

7. In a leather-stretching apparatus, the combination with a body forming a table for the support thereon of the skin or hide which is to be stretched, of a series of cross-bars, differentially moving racks connected with said cross-bars, gear-wheels in mesh with the teeth of said racks, and stretching members extending from each cross-bar and from the sides of the apparatus, a pinion in mesh with one of said gear-wheels, and means for actuating said pinion, substantially as and for the purposes set forth.

8. In a leather-stretching apparatus, the combination with a body forming a table for the support thereon of the skin or hide which is to be stretched, of a series of cross-bars, differentially moving racks connected with said cross-bars, gear-wheels in mesh with the teeth of said racks, and stretching members extending from each cross-bar and from the sides of the apparatus, a pinion in mesh with one of said gear-wheels, and means for actuating said pinion, consisting of a shaft provided with means for operating the same, a gear-wheel on said shaft, a second shaft, a gear-wheel on said second shaft with which the gear-wheel of the first-mentioned shaft engages, a bevel-gear on said second shaft, and a second bevel-gear arranged upon the spindle of said pinion and in mesh with said first-mentioned bevel-gear, substantially as and for the purposes set forth.

9. In a leather-stretching apparatus, the combination with a hollow body forming a table for the support thereon of a skin or hide which is to be stretched, of a box in said body, said box comprising a base-plate and a top-plate, said box being formed with open parts in its sides, a series of cross-bars in the body of the apparatus, stretching members extending from said cross-bars and from the sides of the body of said apparatus, a series of racks arranged between the bottom and top-plates of said box and having portions extending from the open parts thereof, each rack being connected with a cross-bar, tracks within the body of the apparatus, and rollers connected with said racks and running upon said tracks, and means in said box for producing reciprocatory movements of said racks.

10. In a leather-stretching apparatus, the combination with a hollow body forming a table for the support thereon of a skin or hide which is to be stretched, of a box in said body, said box comprising a base-plate and a top-plate, said box being formed with open parts in its sides, a series of cross-bars in the body of the apparatus, stretching members extending from said cross-bars and from the sides of the body of said apparatus, a series of racks arranged between the bottom and top-plates of said box and having portions extending from the open parts thereof, each rack being connected with a cross-bar, tracks within the body of the apparatus, and rollers connected with said racks and running upon said tracks, and gear-wheels in said box and in mesh with the teeth of said racks for producing reciprocatory movements of said racks.

11. In a leather-stretching apparatus, the combination with a hollow-body forming a table for the support thereon of a skin or hide which is to be stretched, of a box in said body, said box comprising a base-plate and a top-plate, said box being formed with open parts in its sides, a series of cross-bars in the body of the apparatus, stretching members extending from said cross-bars and from the sides of the body of said apparatus, a series of racks arranged between the bottom and top-plates of said box and having portions extending from the open parts thereof, each rack being connected with a cross-bar, tracks within the body of the apparatus, and rollers connected with said racks and running upon said tracks, and gear-wheels in said box and in mesh with the teeth of said racks for producing reciprocatory movements of said racks, a pinion also arranged in said box and in mesh with one of said gear-wheels, and means for actuating said pinion, substantially as and for the purposes set forth.

12. In a leather-stretching apparatus, the combination with a hollow body forming a table for the support thereon of a skin or hide which is to be stretched, of a box in said body, said box comprising a base-plate and a top-plate, said box being formed with open parts in its sides, a series of cross-bars in the body of the apparatus, stretching members extending from said cross-bars and from the sides of the body of said apparatus, a series of racks arranged between the bottom and top-plates of said box and having portions extending from the open parts thereof, each rack being connected with a cross-bar, tracks within the body of the apparatus, and rollers connected with said racks and running upon said tracks, and gear-wheels in said box and in mesh with the teeth of said racks for producing reciprocatory movements of said racks, a pinion also arranged in said box and in mesh with one of said gear-wheels, and means for actuating said pinion, consisting of a shaft provided with means for operating the same, a gear-wheel on said shaft, a second shaft, a gear-wheel on said second shaft with which the gear-wheel of the first-mentioned shaft engages, a bevel-gear on said second shaft, and a second bevel-gear arranged upon the spindle of said pinion and in mesh with said first-mentioned bevel-gear, substantially as and for the purposes set forth.

13. In a leather-stretching apparatus, the combination with a hollow body forming a table for the support of a skin or hide which is to be stretched, of a box in said body, said box comprising a base-plate and a top-plate, and said box being formed with open parts in its sides, a series of rollers in said box, a series of racks arranged between the bottom and top-plates of said box and having portions extending from the open parts thereof, said racks being in rolling engagement with the rollers in said box, stretching members extending from the sides of the body of said apparatus and adapted to be actuated by said racks, and means in said box for producing reciprocatory movements of said racks.

14. In a leather-stretching apparatus, the combination with a hollow body forming a table for the support of a skin or hide which is to be stretched, of a box in said body, said box comprising a base-plate and a top-plate, and said box being formed with open parts in its sides, a series of rollers in said box, a series of racks arranged between the bottom and top-plates of said box and having portions extending from the open parts thereof, said racks being in rolling engagement with the rollers in said box, stretching members extending from the sides of the body of said apparatus and adapted to be actuated by said racks, and gear-wheels on said box and in mesh with the teeth of said racks for producing reciprocatory movements of said racks.

15. In a leather-stretching apparatus, the combination with a hollow body forming a table for the support of a skin or hide which is to be stretched, of a box in said body, said box comprising a base-plate and a top-plate, and said box being formed with open parts in its sides, a series of rollers in said box, a series of racks arranged between the bottom and top-plates of said box and having portions extending from the open parts thereof, said racks being in rolling engagement with the rollers in said box, stretching members extending from the sides of the body of said apparatus and adapted to be actuated by said racks, and gear-wheels in said box and in mesh with the teeth of said racks for producing reciprocatory movements of said racks, a pinion also arranged in said box and in mesh with one of said gear-wheels, and means for actuating said pinion, substantially as and for the purposes set forth.

16. In a leather-stretching apparatus, the combination with a hollow body forming a table for the support of a skin or hide which is to be stretched, of a box in said body, said box comprising a base-plate and a top-plate, and said box being formed with open parts in its sides, a series of rollers in said box, a series of racks arranged between the bottom and top-plates of said box and having portions extending from the open parts thereof, said racks being in rolling engagement with the rollers in said box, stretching members extending from the sides of the body of said apparatus and adapted to be actuated by said racks, and gear-wheels on said box and in mesh with the teeth of said racks for producing reciprocatory movements of said racks, a pinion also arranged in said box and in mesh with one of said gear-wheels, and means for actuating said pinion, consisting of a shaft provided with means for operating the same, a gear-wheel on said shaft, a second shaft, a gear-wheel on said second shaft with which the gear-wheel of the first-mentioned shaft engages, a bevel-gear on said second shaft, and a second bevel-gear arranged upon the spindle of said pinion and in mesh with said first-mentioned bevel-gear, substantially as and for the purposes set forth.

17. In a leather-stretching apparatus, the combination with a hollow body forming a table for the support of a skin or hide which is to be stretched, of a box in said body, said box comprising a base-plate and a top-plate, and said box being formed with open parts in its sides, a series of rollers in said box, a series of racks arranged between the bottom and top-plates of said box and having portions extending from the open parts thereof, said racks being in rolling engagement with the rollers in said box, stretching members extending from the sides of the body of said apparatus and adapted to be actuated by said racks, and means in said box for producing reciprocatory movements of said racks, tracks within the body of the apparatus, and rollers connected with said racks and running upon said tracks, substantially as and for the purposes set forth.

18. In a leather-stretching apparatus, the combination with a hollow body forming a table for the support of a skin or hide which is to be stretched, of a box in said body, said box comprising a base-plate and a top-plate, and said box being formed with open parts in its sides, a series of rollers in said box, a series of racks arranged between the bottom and top-plates of said box and having portions extending from the open parts thereof, said racks being in rolling engagement with the rollers in said box, stretching members extending from the sides of the body of said apparatus and adapted to be actuated by said racks, and gear-wheels in said box and in mesh with the teeth of said racks for producing reciprocatory movements of said racks, tracks within the body of the apparatus, and rollers connected with said racks and running upon said tracks, substantially as and for the purposes set forth.

19. In a leather-stretching apparatus, the combination with a hollow body forming a table for the support of a skin or hide which is to be stretched, of a box in said body, said box comprising a base-plate and a top-plate, and said box being formed with open parts in its sides, a series of rollers in said box, a series of racks arranged between the bottom and top-plates of said box and having portions extending from the open parts thereof, said racks being in rolling engagement with the rollers in said box, stretching members extending from the sides of the body of said apparatus and adapted to be actuated by said racks, and gear-wheels in said box and in mesh with the teeth of said racks for producing reciprocatory movements of said racks, a pinion also arranged in said box and in mesh with one of said gear-wheels, and means for actuating said pinion, tracks within the body of the apparatus, and rollers connected with said racks and running upon said tracks, substantially as and for the purposes set forth.

20. In a leather-stretching apparatus, the combination with a hollow body forming a table for the support of a skin or hide which is to be stretched, of a box in said body, said box comprising a base-plate and a top-plate, and said box being formed with open parts in its sides, a series of rollers in said box, a series of racks arranged between the bottom and top-plates of said box and having portions extending from the open parts thereof, said racks being in rolling engagement with the rollers in said box, stretching members extending from the sides of the body of said apparatus and adapted to be actuated by said racks, and gear-wheels in said box and in mesh with the teeth of said racks for producing reciprocatory movements of said racks, a pinion also arranged in said box and in mesh with one of said gear-wheels, and means for actuating said pinion, consisting of a shaft provided with means for operating the same, a gear-wheel on said shaft, a second shaft, a gear-wheel on said second shaft with which the gear-wheel of the first-mentioned shaft engages, a bevel-gear on said second shaft, and a second bevel-gear arranged upon the spindle of said pinion and in mesh with said first-mentioned bevel-gear, tracks within the body of the apparatus, and rollers connected with said racks and running upon said tracks, substantially as and for the purposes set forth.

In testimony, that I claim the invention set forth above I have hereunto set my hand this 18th day of December, 1907.

ARTHUR CLEVELAND.

Witnesses:
FREDK. C. FRAENTZEL,
ANNA H. ALTER.